United States Patent
Sun

(10) Patent No.: US 11,952,311 B2
(45) Date of Patent: *Apr. 9, 2024

(54) OPTICAL GLASS, GLASS PREFABRICATED MEMBER OR OPTICAL ELEMENT PREPARED THEREFROM, AND OPTICAL INSTRUMENT

(71) Applicant: CDGM GLASS CO., LTD., Sichuan (CN)

(72) Inventor: Wei Sun, Beijing (CN)

(73) Assignee: CDGM GLASS CO., LTD., Sichuan (CN)

( * ) Notice: Subject to any disclaimer, the term of this patent is extended or adjusted under 35 U.S.C. 154(b) by 389 days.

This patent is subject to a terminal disclaimer.

(21) Appl. No.: 17/267,046

(22) PCT Filed: Aug. 17, 2018

(86) PCT No.: PCT/CN2018/101158
§ 371 (c)(1),
(2) Date: Feb. 9, 2021

(87) PCT Pub. No.: WO2020/034213
PCT Pub. Date: Feb. 20, 2020

(65) Prior Publication Data
US 2021/0309560 A1 Oct. 7, 2021

(51) Int. Cl.
*C03C 3/068* (2006.01)
*G02B 1/00* (2006.01)

(52) U.S. Cl.
CPC ............... *C03C 3/068* (2013.01); *G02B 1/00* (2013.01)

(58) Field of Classification Search
CPC .............................. C03C 3/068; C03C 3/064
See application file for complete search history.

(56) References Cited

U.S. PATENT DOCUMENTS

2021/0070648 A1* 3/2021 Sun .................... C03C 3/068

FOREIGN PATENT DOCUMENTS

| CN | 1532160 | A | | 9/2004 |
|----|---------|---|---|--------|
| CN | 1729147 | A | | 2/2006 |
| CN | 102295409 | A | | 12/2011 |
| CN | 106495465 | A | | 3/2017 |
| JP | 2003201142 | A | | 7/2003 |
| JP | 2008214135 | A | | 9/2008 |
| JP | 2012166962 | A | * | 9/2012 |
| JP | 2012166962 | A | | 9/2012 |
| JP | 2013063887 | A | | 4/2013 |
| JP | 2018048034 | A | | 3/2018 |
| WO | 2004054937 | A1 | | 7/2004 |

OTHER PUBLICATIONS

Office action of corresponding JP application No. 2021-507811.

* cited by examiner

*Primary Examiner* — Elizabeth A. Bolden
(74) *Attorney, Agent, or Firm* — Samson G. Yu

(57) ABSTRACT

Disclosed are optical glass, a glass preform or an optical element made therefrom the same and an optical instrument. The optical glass is calculated by a mass percentage content relative to a total mass of glass converted by an oxide, and the optical glass includes: $B_2O_3$: 5~25%, $SiO_2$: 0.5~15%, $ZrO_2$: 1~15%, $TiO_2$: 0~10%, $Ta_2O_5$: 0.5~10%, and $La_2O_3$, $Gd_2O_3$, $Y_2O_3$ and $Yb_2O_3$ of which the sum is 50~75%, and $Nb_2O_5$ is not contained, a weight ratio of $La_2O_3$ to $Gd_2O_3$, i.e., $La_2O_3/Gd_2O_3$, is 1.28~1.625.

20 Claims, No Drawings

OPTICAL GLASS, GLASS PREFABRICATED MEMBER OR OPTICAL ELEMENT PREPARED THEREFROM, AND OPTICAL INSTRUMENT

TECHNICAL FIELD

The disclosure relates to the technical field of optical glass, and in particular to an optical glass, a glass preform or an optical element made therefrom and an optical instrument.

BACKGROUND

At present, along with the development of a digital camera device, a camera shooting device and a projection device and the like, requirements for an optical element are higher, this requires the development and production of optical glass with higher performance. Herein, a lens formed by high refractive index and low dispersion optical glass is combined with a lens formed by high refractive index and high dispersion optical glass, and a chromatic aberration may be corrected, so an optical system is miniaturized, especially the high refractive index and low dispersion optical glass of which a refractive index nd is greater than 1.87 and an Abbe number vd is greater than 38.0, a market demand is increased day by day.

In order to meet the above optical property indexes, it is better that a basic formula system is B—La—Zr—Ta, it is easy to form the glass and beneficial to production. In addition, under normal conditions, it is necessary to introduce more rare earth oxides in a high refractive index and low dispersion glass formula system so as to improve a refractive index of the glass. However, in different formula systems, the more lanthanide oxides introduced may affect a glass forming ability, the glass may easily be crystallized if a content is higher, and a upper crystallization temperature is higher, it brings difficulties to a mass production process manufacture.

SUMMARY

The disclosure aims to provide an optical glass, a glass preform or an optical element made therefrom and an optical instrument, it is discovered through a research by the inventor that, through controlling $La_2O_3/Gd_2O_3$ and a content of $Ta_2O_5$ in a B—La—Zr—Ta formula system, technical problems existing in the prior art that high refractive index and low dispersion optical glass is easy in devitrification and difficult to mass production can be solved.

In order to achieve the above purpose, according to one aspect of the disclosure, optical glass is provided. The optical glass is calculated by a mass percentage content relative to a total mass of glass converted by an oxide, and the optical glass includes: $B_2O_3$: 5-25%, $SiO_2$: 0.5-15%, $ZrO_2$: 1-15%, $TiO_2$: 0.5-10%, and the sum of $La_2O_3$, $Gd_2O_3$, $Y_2O_3$ and $Yb_2O_3$ is 50-75%, and $Nb_2O_5$ is not contained, a weight ratio of $La_2O_3$ to $Gd_2O_3$, i.e., $La_2O_3/Gd_2O_3$, is 1.28-1.625.

Further, the optical glass further includes one or more selected from a group consisting of ZnO, BaO, CaO, SrO, MgO, $WO_3$, $Sb_2O_3$, $Li_2O$, $Na_2O$ and $K_2O$, and the content is as follows: ZnO: 0-15%; BaO: 0-10%; CaO: 0-10%; SrO: 0-10%; MgO: 0-10%; $WO_3O_3$: 0-10%; $Sb_2O_3$: 0-1%, the sum of the $Li_2O$, $Na_2O$ and $K_2O$ is 0-10%.

Further, relative to the total mass of the glass converted by the oxide, and calculated by the mass percentage content, the optical glass is consisted of $B_2O_3$: 5-25%, $SiO_2$: 0.5-15%, $ZrO_2$: 1-15%, $TiO_2$: 0-10%, ZnO: 0-15%, BaO: 0-10%, CaO: 0-10%, SrO: 0-10%, MgO: 0-10%, $WO_3$: 0-10%, $Ta_2O_5$: 0.5-10%, the sum of $Li_2O$, $Na_2O$ and $K_2O$ is 0-10%, $Sb_2O_3$: 0-1%, and the sum of $La_2O_3$, $Gd_2O_3$, $Y_2O_3$ and $Yb_2O_3$ is 50-75%, herein, the weight ratio of $La_2O_3$ to $Gd_2O_3$, i.e., $La_2O_3/Gd_2O_3$, is 1.28-1.625.

Further, relative to the total mass of the glass converted by the oxide, and calculated by the mass percentage content, the optical glass includes: $B_2O_3$: 8-22%, $SiO_2$: 3-10%, $ZrO_2$: 3-12%, $TiO_2$: 0.5-7%, and/or the sum of $La_2O_3$, $Gd_2O_3$, $Y_2O_3$ and $Yb_2O_3$ is 55-70%.

Further, the $La_2O_3/Gd_2O_3$ is 1.3-1.6.

Further, the $La_2O_3/Gd_2O_3$ is 1.4-1.5.

Further, the content of $Y_2O_3$ of the optical glass is 0.1-8%.

Further, the content of $WO_3$ of the optical glass is 0.1-5%; and further, a upper crystallization temperature of the optical glass is lower than 1350° C., preferably lower than 1300° C.

Further, a refractive index of the optical glass nd>1.87, preferably nd>1.88; and an Abbe number vd>38.0, preferably vd>39.0.

Further, durability of water Dw of the optical glass is above grade 3, preferably above grade 2, more preferably above grade 1; and durability of acid $D_A$ is above grade 3, preferably above grade 2, and more preferably grade 1.

Further, a extent of striae of the optical glass is above grade C, preferably above grade B, and more preferably grade A; and a bubble content is above grade A, preferably above grade $A_0$, and more preferably grade $A_{00}$.

According to another aspect of the disclosure, a glass preform or an optical element is provided.

The glass preform or the optical element is made of any one of the above optical glass.

According to another aspect of the disclosure, an optical instrument is provided, the optical instrument includes an optical element, and the optical element is any one of the above optical elements.

By applying a technical solution of the disclosure, and strictly controlling components, a content and a dosage proportion between specific components of the optical glass, the optical glass of the disclosure may acquire the high refractive index and low dispersion optical glass with devitrification resistance and excellent performance, and the optical glass of the disclosure is easy to mass production.

DETAILED DESCRIPTION OF THE EMBODIMENTS

It is to be noted that embodiments in the present application and features in the embodiments may be combined with each other in the case without conflicting. The disclosure is described in detail below in combination with the embodiments.

In the description, unless otherwise specified, contents of various components are all represented by mass % relative to a total mass of glass converted by an oxide. Herein, "converted by an oxide" means that it is assumed that raw materials as constituent components of the glass of the disclosure are all decomposed and converted into the oxides during melting, and a total mass of the generated oxides are used as 100 mass % to represent various components contained in the glass.

A basic effect played by each component in the optical glass is described below, but it does not improperly limit a synergistic effect or an unexpected effect between the components due to a specific content ratio.

$B_2O_3$ is a framework component of the glass, and has effects of improving glass meltability, devitrification resistance and reducing glass dispersion in the disclosure. However, while a content of $B_2O_3$ exceeds 25%, the stability of the glass may be decreased, and the refractive index is decreased. While a content of $B_2O_3$ is less than 5%, the glass meltability is decreased, and it fails to reach an optical constant required by the disclosure. Therefore, a content of $B_2O_3$ in the disclosure is 5-25%, and the content of $B_2O_3$ is preferably 8-22%.

$Nb_2O_5$ is a component for improving the refractive index and dispersion, and also has effects of improving the devitrification resistance and chemical stability of the glass, but it is high in price, so that a production cost of the glass is increased. Therefore, the disclosure preferably does not contain the $Nb_2O_5$.

$SiO_2$ is a component for constituting a glass framework, and it has effects of improving devitrification resistance and extending an operating temperature range. In addition, it also has the effects of improving the chemical stability of the glass and improving the thermal stability of the glass and the like. If a content of $SiO_2$ exceeds 15%, the glass meltability may be decreased, and the refractive index required by the disclosure may not be obtained. In the disclosure, the content of $SiO_2$ is 0.5-15%, preferably the content of $SiO_2$ is 3-10%.

$ZrO_2$ is a component for improving the refractive index and stability. Because it forms the glass as an intermediate oxide, it also has effects of improving the devitrification resistance and chemical durability. While a content of $ZrO_2$ is less than 1%, the above expected effects may not be achieved, and while the content of $ZrO_2$ exceeds 15%, there is a tendency that the devitrification becomes stronger and the vitrification becomes more difficult. In the disclosure, the content of $ZrO_2$ is 1-15%, and preferably the content of $ZrO_2$ is 3-12%.

$TiO_2$ also has an effect of improving the refractive index of the glass, and may participate in formation of a glass network, and an appropriate content of $TiO_2$ makes the glass more stable. However, if the content of $TiO_2$ is excessive, the glass dispersion may be improved significantly, and at the same time, a transmittance of a short-wave part of a visible light region of the glass is decreased, and a tendency of coloring of the glass is increased. In the disclosure, a content of $TiO_2$ is 0.5-10%, and preferably 0.5-7%.

$Ta_2O_5$ is a component for improving the refractive index and devitrification resistance of the glass. A content of $Ta_2O_5$ is controlled to 0.5-10%. In addition to reducing the cost of the glass, the upper crystallization temperature of the glass may be effectively reduced, so that the glass may be produced stably, and achieve a desired optical constant. Therefore, the content of $Ta_2O_5$ in the disclosure is 0.5-10%, preferably 3-8%.

$La_2O_3$, $Gd_2O_3$, $Y_2O_3$ and $Yb_2O_3$ are all main components for improving the refractive index of the glass, may improve the refractive index, but may not significantly improve the dispersion. A certain content of the above rare earth oxides is added in the glass of the present application, so the upper crystallization temperature may be reduced, the devitrification resistance of the glass is improved, the chemical stability is improved, and it is not easy to generate glass bubbles during a melting process and the like. Therefore, in a formula system of the high refractive index and low dispersion glass of the disclosure, the sum of $La_2O_3$, $Gd_2O_3$, $Y_2O_3$ and $Yb_2O_3$ is not less than 50% and not more than 75%, as to ensure the achievement of the above technical effects and achieve the purpose of the disclosure; and a preferred range is 55-70%, more preferably 60-67%. However, under normal conditions, introduction of more lanthanide oxides may also affect a glass forming ability. If a content is excessive, the glass is easy to crystallize, and the upper crystallization temperature is higher, difficulties are brought to a mass production process manufacture. Therefore, the content of the lanthanide oxides with the high refractive index and low dispersion performance is usually below 60% to ensure that the glass is not easy to crystallize, and in the high refractive index and low dispersion glass of the disclosure, through controlling the components and a weight ratio of the lanthanide oxides $La_2O_3$ to $Gd_2O_3$, i.e., $La_2O_3/Gd_2O_3$, to be 1.28-1.625, it still may be guaranteed that the upper crystallization temperature of the glass is not increased while the content of the lanthanide oxides is less than 60% and more than 60%, the upper crystallization temperature is lower than 1350° C., preferably lower than 1300° C., and more preferably lower than 1280° C., it may be ensured that the glass forming abilities of the components are better, the glass bubbles are not easily generated in the melting process, and good optical property and forming property are also guaranteed and the like. Preferably, the $La_2O_3/Gd_2O_3$ is 1.3-1.6; and more preferably, the $La_2O_3/Gd_2O_3$ is 1.4-1.5.

ZnO may adjust the refractive index and dispersion of the glass, a suitable content of ZnO may achieve effects of improving the stability or meltability of the glass, and improving press formability. However, while a content thereof is too high, the refractive index is reduced, the requirements of the disclosure may not be achieved, and at the same time, the devitrification resistance of the glass is decreased, and the upper crystallization temperature is improved. Therefore, the content of ZnO of the disclosure is 0-15%, preferably 0-10%, and more preferably 0-5%.

Alkaline earth metal oxides such as BaO, CaO, SrO, and MgO may reduce the chemical stability of the glass and improve the upper crystallization temperature, but while a respective content thereof exceeds 10%, the devitrification resistance of the glass is reduced. Therefore, the content of BaO in the disclosure is 0-10%; the content of CaO is 0-10%; the content of SrO is 0-10%, and the content of MgO is 0-10%.

$Li_2O$, $Na_2O$, and $K_2O$ are components for suppressing phase separation and improving glass stability. While a content thereof exceeds 10%, there is a tendency that the chemical stability is significantly reduced or the refractive index is reduced. Preferably, the sum of the $Li_2O$, $Na_2O$ and $K_2O$ is 0-10%.

According to a typical implementation mode of the disclosure, an optical glass is provided. The optical glass is calculated by a mass percentage content relative to a total mass of glass converted by an oxide, and the optical glass includes: $B_2O_3$: 5-25%, $SiO_2$: 0.5-15%, $ZrO_2$: 1-15%, $TiO_2$: 0-10%, $Ta_2O_5$: 0.5-10%, and $La_2O_3$, $Gd_2O_3$, $Y_2O_3$ and $Yb_2O_3$ of which the sum is 50-75%, and $Nb_2O_5$ is not contained, a weight ratio of $La_2O_3$ to $Gd_2O_3$, i.e., $La_2O_3/Gd_2O_3$, is 1.28-1.625.

By applying a technical solution of the disclosure, and strictly controlling components, a content and a dosage proportion between specific components of the optical glass, the optical glass of the disclosure has good devitrification resistance and optical performance, and is easy to mass production.

According to a typical implementation mode of the disclosure, the optical glass further includes one or more selected from a group consisting of ZnO, BaO, CaO, SrO, MgO, $WO_3$, $Sb_2O_3$, $Li_2O$, $Na_2O$ and $K_2O$, and the content is as follows: ZnO: 0-15%, BaO: 0-10%; CaO: 0-10%; SrO: 0-10%; MgO: 0-10%; $WO_3$: 0-10%, $Sb_2O_3$: 0-1%, the sum of $Li_2O$, $Na_2O$ and $K_2O$ is 0-10%.

According to a typical implementation mode of the disclosure, relative to the total mass of the glass converted by the oxide, and calculated by the mass percentage content, the optical glass is consisted of $B_2O_3$: 5-25%, $SiO_2$: 0.5-15%, $ZrO_2$: 1-15%, $TiO_2$: 0-10%, ZnO: 0-15%, BaO: 0-10%, CaO: 0-10%, SrO: 0-10%, MgO: 0-10%, $WO_3$: 0-10%, $Ta_2O_5$: 0.5-10%, the sum of $Li_2O$, $Na_2O$ and $K_2O$ is 0-10%, $Sb_2O_3$: 0-1%, and/or the sum of $La_2O_3$, $Gd_2O_3$, $Y_2O_3$ and $Yb_2O_3$ is 50-75%. Herein, a weight ratio of $La_2O_3$ to $Gd_2O_3$, i.e., $La_2O_3/Gd_2O_3$, is 1.28-1.625. The components, the content and the dosage proportion between the specific components of the optical glass are strictly controlled, so that the optical glass of the disclosure has the better devitrification resistance and the good optical property, and is easy to mass production.

Preferably, according to a typical implementation mode of the disclosure, relative to the total mass of the glass converted by the oxide, and calculated by the mass percentage content, the optical glass includes: $B_2O_3$: 8-22%, $SiO_2$: 3-10%, $ZrO_2$: 3-12%, $TiO_2$: 0.5-7%, and the sum of $La_2O_3$, $Gd_2O_3$, $Y_2O_3$ and $Yb_2O_3$ is 55~70%, the weight ratio of $La_2O_3$ to $Gd_2O_3$, i.e., $La_2O_3/Gd_2O_3$, is 1.28-1.625. In the disclosure, the $Y_2O_3$ may improve meltability and devitrification resistance of the glass, and at the same time may reduce a upper crystallization temperature of the glass, but if a content thereof exceeds a certain amount, the stability and devitrification resistance of the glass is decreased. Therefore, the content of the $Y_2O_3$ is 0-10%, and the content is preferably 0.1-8%.

The $WO_3$ plays a role in improving the refractive index, but while a $WO_3$ content exceeds 10%, there is a tendency of enhanced devitrification and difficult vitrification, the dispersion is significantly improved, a transmittance at a short-wavelength side of a visible light region of the glass is decreased, and a tendency of coloring is improved. Therefore, the content of $WO_3$ is preferably 0-10% in the disclosure, and the content is preferably 0.1-5%.

The disclosure is capable of, through synergistic effects of the components $Y_2O_3$, $Ta_2O_5$, $WO_3$ and the like to improve the refractive index, controlling an content of $Ta_2O_5$, and an appropriate content of $Y_2O_3$ and $WO_3$ to obtain the optical constant required by the disclosure, as well as improving the melting performance of the glass, and improving the bubble grade, herein it reaches the grade A.

A clarification effect of the glass may be improved by adding a small amount of $Sb_2O_3$, $SnO_2$, and $CeO_2$ components. However, while a content of $Sb_2O_3$ content exceeds 1%, the glass has a tendency of reducing the clarification performance, and at the same time, because a strong oxidation effect thereof promotes deterioration of a forming mold, an addition amount of the $Sb_2O_3$ is preferably is 0-1% in the disclosure, and more preferably 0-0.5%. The $SnO_2$ may also be added as a clarifying agent, but while a content thereof exceeds 1%, the glass may be colored, or while the glass is formed again by heating, softening and molding and the like, Sn may become a starting point for generation of a crystal nucleus, and a tendency of the devitrification is generated. Therefore, the content of $SnO_2$ in the disclosure is preferably 0-1%, more preferably 0-0.5%, and further preferably it is not added. An effect and an addition proportion of $CeO_2$ are the same as the $SnO_2$, and a content thereof is preferably 0-1%, more preferably 0-0.5%, and further preferably it is not added.

Under a precondition without affecting the performance of the optical glass of the disclosure, a certain amount of $P_2O_5$, $Al_2O_3$, $Bi_2O_3$, $GeO_2$, $Lu_2O_3$, F and other components may be appropriately introduced.

The optical glass of the disclosure is the high refractive index and low dispersion glass, a lens made of the high refractive index and low dispersion glass is mostly combined with a lens made of the high refractive index and high dispersion glass for chromatic aberration correction, and in the case that the optical glass is used as a lens, the refractive index is higher, the lens may be thinner, and it is beneficial to miniaturization of an optical device. The refractive index of the optical glass of the disclosure nd>1.87, preferably nd>1.88, an Abbe number vd>38.0, preferably vd>39.0.

The crystallization performance of the glass is measured by using a temperature gradient furnace method, the glass is made into a sample of 180*10*10 mm, a side face is polished, and it is placed in a furnace with a temperature gradient (5° C./cm). After a temperature is raised to 1400° C. for 4 hours, it is taken out and naturally cooled to a room temperature. A devitrification condition of the glass is observed under a microscope, the highest temperature corresponding to the appearance of a crystal in the glass is the upper crystallization temperature of the glass. The upper crystallization temperature of the glass is lower, the stability of the glass is stronger at a high temperature and the process performance of production is better. According to a typical implementation mode of the disclosure, preferably, the upper crystallization temperature of the optical glass is lower than 1350° C., preferably lower than 1300° C., and more preferably lower than 1280° C.

In manufacture and use processes of an optical glass element, an ability of a polished surface thereof to resist the action of various corrosive mediums such as water and acids is called as the chemical stability of the optical glass, and it is mainly dependent on chemical constituents of the glass. Durability of water Dw (powder method) of the optical glass of the disclosure is above grade 3, preferably above grade 2, and more preferably above grade 1; and durability of acid $D_A$ (powder method) is above grade 3, preferably above grade 2, and more preferably above grade 1.

A extent of striae is detected by using a extent of striae instrument formed by a point light source and a lens from a direction in which a stripe is most easily seen. Compared with a standard sample, it is divided into 4 grades, namely the grades A, B, C, and D. The grade A means that there are no macroscopic stripes under specified detection conditions, the grade B means that there are thin and scattered stripes under the specified detection conditions, the grade C means that there are no slight parallel stripes under the specified detection conditions, and the grade D means that there are rough stripes under the specified detection conditions. Because this type of products in the prior art are worse in crystallization resistance under a condition without using precious oxides such as $Ta_2O_5$, the production of a product with a thickness of more than 20 mm is easy to generate a devitrification stripe. A thick specification product is a necessary specification for manufacturing a large-diameter (greater than 60 mm) lens. At present, due to the development of an optical technology, more and more large-diameter lenses are required, and manufacturers are required to provide blank products with a thickness of more than 20 mm.

Bubble quality of the optical glass is measured according to a test method specified in GB/T 7962.8-2010. A bubble content is a level of allowable bubble content in the glass. Bubbles may not only affect the appearance quality of a glass product, but also affect the optical property, transparency, and mechanical strength and the like of the glass, and many adverse effects are caused to the glass. Therefore, it is very important to control the bubble content of the glass. In the disclosure, through controlling the sum of rare earth oxides $La_2O_3$, $Gd_2O_3$, $Y_2O_3$ and $Yb_2O_3$, or the weight ratio of $La_2O_3$ to $Gd_2O_3$, the bubble content of the glass may be further achieved above grade A, preferably above grade $A_0$, and more preferably grade $A_{00}$.

According to another aspect of the disclosure, a glass preform or an optical element is provided. The glass preform or the optical element is made of any one of the above optical glass. The glass preform of the disclosure has the characteristics of high refractive index and low dispersion; and the optical element of the disclosure has the characteristics of high refractive index and low dispersion, and may provide various lenses, prisms and other optical elements with excellent optical performance. In examples as the lenses, various lenses such as a concave meniscus lens, a convex meniscus lens, a biconvex lens, a biconcave lens, a planoconvex lens and a planoconcave lens of which a lens surface is spherical or non-spherical may be listed. This types of the lens may correct chromatic aberration by combining with a lens made of the high refractive index and high dispersion glass, and is suitably served as a lens for chromatic aberration correction. In addition, it is also an effective lens for making the optical system compact. In addition, because of a high refractive index, the prism faces to a required direction by combining in a camera shooting optical system and bending an optical path, and a compact and wide-angle optical system may be achieved.

According to another aspect of the disclosure, an optical instrument is provided, the optical instrument includes an optical element, and the optical element is any one of the above optical elements. The optical instrument of the disclosure may be a digital camera, a video camera and the like.

The beneficial effects of the disclosure are further described below in combination with embodiments.

EMBODIMENT

Embodiment of Optical Glass

In order to obtain glass having components shown in Table 1 to Table 6, a carbonate, a nitrate, a hydroxide, an oxide, a boric acid and the like are used as raw materials, and raw materials corresponding to the optical glass components are weighed in proportion. After being adequately mixed, it becomes a blended raw material. The blended raw material is put into a platinum crucible, and heated to 1200-1450° C. After melting, stirring and clarifying, uniform molten glass is formed, and then the molten glass is poured into a preheated mold after being moderately cooled and kept at 650-700° C. for 2-4 hours, and then slowly cooled, to obtain the optical glass. In addition, the characteristics of each glass are measured by a method shown below, and measurement results are shown in Tables 1 to Table 6.

(1) Upper Crystallization Temperature

The crystallization performance of the glass is measured by using a temperature gradient furnace method, the glass is made into a sample of 180*10*10 mm, a side face is polished, and it is placed in a furnace with a temperature gradient (5° C./cm). After a temperature is raised to 1400° C. for 4 hours, it is taken out and naturally cooled to a room temperature. A devitrification condition of the glass is observed under a microscope, the highest temperature corresponding to the appearance of a crystal in the glass is the upper crystallization temperature of the glass.

(2) Refractive Index Nd and Abbe Number Vd

Refractive index and dispersion coefficient are tested according to a method specified in GB/T7962.1-2010.

(3) Chemical Stability

Durability of water Dw and durability of acid $D_A$ are tested according to a test method of GB/T 17129.

(4) Bubble Content

Bubble quality of the optical glass is measured according to a test method specified in GB/T7962.8-2010.

TABLE 1

| Component % | Embodiment 1 | Embodiment 2 | Embodiment 3 | Embodiment 4 | Embodiment 5 | Embodiment 6 | Embodiment 7 |
|---|---|---|---|---|---|---|---|
| $B_2O_3$ | 21 | 21.6 | 19.1 | 15.7 | 18.6 | 16.6 | 15.6 |
| $SiO_2$ | 6.6 | 5.8 | 6.1 | 5.7 | 6.2 | 5.9 | 5.7 |
| $ZrO_2$ | 6 | 6.1 | 6.2 | 6.4 | 5.9 | 5.8 | 5.6 |
| $TiO_2$ | 1.8 | 0 | 1.8 | 1.9 | 1.5 | 3 | 3 |
| $La_2O_3$ | 38.2 | 38.5 | 38.8 | 39 | 37 | 34 | 35 |
| $Gd_2O_3$ | 25.4 | 24 | 26 | 27.8 | 25.8 | 26 | 26 |
| $Y_2O_3$ | 0 | 0 | 0 | 0 | 0 | 0 | 0 |
| $Yb_2O_3$ | 0 | 1.7 | 0 | 0 | 0 | 0 | 0 |
| $Ta_2O_5$ | 1 | 1 | 2 | 3.5 | 5 | 6.1 | 7 |
| ZnO | 0 | 0 | 0 | 0 | 0 | 0 | 0 |
| BaO | 0 | 1.3 | 0 | 0 | 0 | 0 | 0 |
| CaO | 0 | 0 | 0 | 0 | 0 | 2.6 | 0 |
| SrO | 0 | 0 | 0 | 0 | 0 | | |
| MgO | 0 | 0 | 0 | 0 | 0 | 0 | 0 |
| $WO_3$ | 0 | 0 | 0 | 0 | 0 | 0 | 0 |
| $Sb_2O_3$ | 0 | 0 | 0 | 0 | 0 | 0 | 0 |
| $Li_2O$ | 0 | 0 | 0 | 0 | 0 | 0 | 0 |
| $Na_2O$ | 0 | 0 | 0 | 0 | 0 | 0 | 0 |
| $K_2O$ | 0 | 0 | 0 | 0 | 0 | 0 | 2.1 |
| $La_2O_3/Gd_2O_3$ | 1.503937 | 1.604167 | 1.492308 | 1.402878 | 1.434109 | 1.307692 | 1.346154 |
| $La_2O_3 + Gd_2O_3 + Y_2O_3 + Yb_2O_3$ | 63.6 | 64.2 | 64.8 | 66.8 | 62.8 | 60 | 61 |
| $Li_2O + Na_2O + K_2O$ | 0 | 0 | 0 | 0 | 0 | 0 | 2.1 |
| Total content | 100 | 100 | 100 | 100 | 100 | 100 | 100 |
| Upper crystallization temperature ° C. | 1280 | 1290 | 1275 | 1280 | 1280 | 1300 | 1300 |
| Refractive index nd | 1.884 | 1.885 | 1.887 | 1.888 | 1.889 | 1.89 | 1.889 |
| Abbe number vd | 39.08 | 39.17 | 39.12 | 39.24 | 39.23 | 39.25 | 39.25 |

TABLE 1-continued

| Component % | Embodiment 1 | Embodiment 2 | Embodiment 3 | Embodiment 4 | Embodiment 5 | Embodiment 6 | Embodiment 7 |
|---|---|---|---|---|---|---|---|
| Durability of water $D_W$ | 1 | 1 | 1 | 1 | 1 | 2 | 2 |
| Durability of acid $D_A$ | 1 | 1 | 1 | 1 | 1 | 2 | 2 |
| Bubble content | $A_{00}$ | $A_{00}$ | $A_{00}$ | $A_{00}$ | $A_{00}$ | $A_{00}$ | $A_{00}$ |

TABLE 2

| Component % | Embodiment 8 | Embodiment 9 | Embodiment 10 | Embodiment 11 | Embodiment 12 | Embodiment 13 | Embodiment 14 |
|---|---|---|---|---|---|---|---|
| $B_2O_3$ | 13.3 | 16.9 | 16.1 | 14.2 | 17 | 17.6 | 22.2 |
| $SiO_2$ | 5.8 | 4 | 4 | 4.5 | 3.8 | 5.8 | 5.9 |
| $ZrO_2$ | 6 | 3 | 2.8 | 4 | 6 | 5.8 | 5.8 |
| $TiO_2$ | 0.9 | 2.4 | 2.6 | 1.5 | 2.8 | 3 | 1.5 |
| $La_2O_3$ | 36 | 25 | 25.8 | 27.8 | 32 | 33.5 | 34 |
| $Gd_2O_3$ | 21.4 | 15.9 | 15.9 | 16.8 | 25.4 | 26 | 26 |
| $Y_2O_3$ | 0 | 10 | 10 | 0 | 0 | 0 | 1 |
| $Yb_2O_3$ | 0 | 0 | 0 | 8 | 0 | 0 | 0.5 |
| $Ta_2O_5$ | 10 | 4.3 | 3.6 | 6 | 6.4 | 5.7 | 0.5 |
| ZnO | 0 | 15 | 15 | 0 | 0 | 0 | 0 |
| BaO | 0 | 0 | 0 | 8 | 0 | 0 | 0 |
| CaO | 2 | 0 | 0 | 0 | 2 | 2.6 | 2.6 |
| SrO | 0 | 3 | 3.4 | 0 | 0 | 0 | 0 |
| MgO | 0 | 0 | 0 | 0 | 0 | 0 | 0 |
| $WO_3$ | 0 | 0 | 0 | 0 | 0 | 0 | 0 |
| $Sb_2O_3$ | 0 | 0.5 | 0.8 | 0 | 0 | 0 | 0 |
| $Li_2O$ | 3.5 | 0 | 0 | 4.5 | 3.5 | 0 | 0 |
| $Na_2O$ | 1.1 | 0 | 0 | 4.7 | 1.1 | 0 | 0 |
| $K_2O$ | 0 | 0 | 0 | 0 | 0 | 0 | 0 |
| $La_2O_3/Gd_2O_3$ | 1.682243 | 1.572327 | 1.622642 | 1.654762 | 1.259843 | 1.288462 | 1.307692 |
| $La_2O_3 + Gd_2O_3 + Y_2O_3 + Yb_2O_3$ | 57.4 | 50.9 | 51.7 | 52.6 | 57.4 | 59.5 | 61.5 |
| $Li_2O + Na_2O + K_2O$ | 4.6 | 0 | 0 | 9.2 | 4.6 | 0 | 0 |
| Total content | 100 | 100 | 100 | 100 | 100 | 100 | 100 |
| Upper crystallization temperature ° C. | 1365 | 1300 | 1330 | 1360 | 1370 | 1330 | 1290 |
| Refractive index nd | 1.881 | 1.883 | 1.881 | 1.878 | 1.883 | 1.885 | 1.877 |
| Abbe number vd | 39.17 | 39.15 | 38.8 | 38.5 | 38.7 | 39.34 | 39.13 |
| Durability of water $D_W$ | 3 | 2 | 3 | 3 | 3 | 2 | 1 |
| Durability of acid $D_A$ | 3 | 2 | 3 | 3 | 3 | 2 | 1 |
| Bubble content | B | $A_0$ | A | B | B | A | $A_0$ |

TABLE 3

| Component % | Embodiment 15 | Embodiment 16 | Embodiment 17 | Embodiment 18 | Embodiment 19 | Embodiment 20 | Embodiment 21 |
|---|---|---|---|---|---|---|---|
| $B_2O_3$ | 18.6 | 16.5 | 10.6 | 9.3 | 17.5 | 18.7 | 20 |
| $SiO_2$ | 6 | 5.8 | 6.1 | 1.3 | 6.2 | 4.4 | 3.1 |
| $ZrO_2$ | 6 | 6.1 | 6.2 | 7.5 | 5.9 | 5.8 | 3.8 |
| $TiO_2$ | 2.2 | 1.9 | 0.8 | 0.5 | 4 | 7 | 10 |
| $La_2O_3$ | 38.2 | 38.5 | 38.8 | 39 | 37 | 34 | 30 |
| $Gd_2O_3$ | 25.4 | 24 | 26 | 27.8 | 25.8 | 26 | 26 |
| $Y_2O_3$ | 0 | 0 | 5.5 | 0 | 0 | 0 | 0 |
| $Yb_2O_3$ | 0 | 0 | 0 | 0 | 0 | 0 | 0 |
| $Ta_2O_5$ | 1 | 3.6 | 6 | 3.4 | 3.6 | 4.1 | 5 |
| ZnO | 0 | 0 | 0 | 11.2 | 0 | 0 | 0 |
| BaO | 0 | 1.3 | 0 | 0 | 0 | 0 | 0 |
| CaO | 0 | 0 | 0 | 0 | 0 | 0 | 0 |
| SrO | 0 | 2.3 | 0 | 0 | 0 | 0 | 0 |
| MgO | 0 | 0 | 0 | 0 | 0 | 0 | 0 |
| $WO_3$ | 2.6 | 0 | 0 | 0 | 0 | 0 | 0 |
| $Sb_2O_3$ | 0 | 0 | 0 | 0 | 0 | 0 | 0 |
| $Li_2O$ | 0 | 0 | 0 | 0 | 0 | 0 | 0 |
| $Na_2O$ | 0 | 0 | 0 | 0 | 0 | 0 | 0 |
| $K_2O$ | 0 | 0 | 0 | 0 | 0 | 0 | 2.1 |

TABLE 3-continued

| Component % | Embodiment 15 | Embodiment 16 | Embodiment 17 | Embodiment 18 | Embodiment 19 | Embodiment 20 | Embodiment 21 |
|---|---|---|---|---|---|---|---|
| $La_2O_3/Gd_2O_3$ | 1.503937 | 1.604167 | 1.492308 | 1.402878 | 1.434109 | 1.307692 | 1.153846 |
| $La_2O_3 + Gd_2O_3 + Y_2O_3 + Yb_2O_3$ | 63.6 | 62.5 | 70.3 | 66.8 | 62.8 | 60 | 56 |
| $Li_2O + Na_2O + K_2O$ | 0 | 0 | 0 | 0 | 0 | 0 | 2.1 |
| Total content | 100 | 100 | 100 | 100 | 100 | 100 | 100 |
| Upper crystallization temperature ° C. | 1280 | 1300 | 1280 | 1280 | 1280 | 1310 | 1340 |
| Refractive index nd | 1.883 | 1.882 | 1.887 | 1.884 | 1.883 | 1.882 | 1.884 |
| Abbe number vd | 39.05 | 39.2 | 39.24 | 39.31 | 39.1 | 39.1 | 38.79 |
| Durability of water Dw | 1 | 1 | 1 | 1 | 1 | 2 | 2 |
| Durability of acid $D_A$ | 1 | 1 | 1 | 1 | 1 | 2 | 2 |
| Bubble content | $A_{00}$ | $A_0$ | $A_{00}$ | $A_{00}$ | $A_{00}$ | $A_{00}$ | A |

TABLE 4

| Component % | Embodiment 22 | Embodiment 23 | Embodiment 24 | Embodiment 25 | Embodiment 26 | Embodiment 27 | Embodiment 28 |
|---|---|---|---|---|---|---|---|
| $B_2O_3$ | 15.8 | 17.3 | 16.4 | 15 | 25 | 15.3 | 16.9 |
| $SiO_2$ | 7.6 | 5.8 | 7.8 | 5.5 | 4 | 5.8 | 5.7 |
| $ZrO_2$ | 6 | 6.1 | 6.2 | 6 | 3.5 | 5.8 | 5.6 |
| $TiO_2$ | 2.8 | 2.7 | 2.8 | 2.9 | 2.5 | 3 | 3 |
| $La_2O_3$ | 38.2 | 38.5 | 38.8 | 39 | 37 | 34 | 35 |
| $Gd_2O_3$ | 25.4 | 24 | 26 | 27.8 | 25.4 | 25.8 | 26 |
| $Y_2O_3$ | 0 | 0 | 0 | 0 | 0 | 0 | 0 |
| $Yb_2O_3$ | 0 | 0 | 0 | 0 | 0 | 0 | 0 |
| $Ta_2O_5$ | 4.2 | 4.3 | 2 | 3.5 | 1 | 8 | 5.6 |
| ZnO | 0 | 0 | 0 | 0 | 1.6 | 0 | 0 |
| BaO | 0 | 1.3 | 0 | 0 | 0 | 0 | 0 |
| CaO | 0 | 0 | 0 | 0 | 0 | 2.2 | 0 |
| SrO | 0 | 0 | 0 | 0 | 0 | 0 | 0 |
| MgO | 0 | 0 | 0 | 0 | 0 | 0 | 0 |
| $WO_3$ | 0 | 0 | 0 | 0 | 0 | 0 | 0 |
| $Sb_2O_3$ | 0 | 0 | 0 | 0 | 0 | 0.1 | 0.1 |
| $Li_2O$ | 0 | 0 | 0 | 0.3 | 0 | 0 | |
| $Na_2O$ | 0 | 0 | 0 | 0 | 0 | 0 | |
| $K_2O$ | 0 | 0 | 0 | 0 | 0 | 0 | 2.1 |
| $La_2O_3/Gd_2O_3$ | 1.503937 | 1.604167 | 1.492308 | 1.402878 | 1.456693 | 1.317829 | 1.346154 |
| $La_2O_3 + Gd_2O_3 + Y_2O_3 + Yb_2O_3$ | 63.6 | 62.5 | 64.8 | 66.8 | 62.4 | 59.8 | 61 |
| $Li_2O + Na_2O + K_2O$ | 0 | 0 | #REF! | 0.3 | 0 | 0 | 2.1 |
| Total content | 100 | 100 | 100 | 100 | 100 | 100 | 100 |
| Upper crystallization temperature ° C. | 1275 | 1290 | 1275 | 1275 | 1280 | 1300 | 1290 |
| Refractive index nd | 1.885 | 1.886 | 1.883 | 1.886 | 1.883 | 1.885 | 1.884 |
| Abbe number vd | 39.23 | 39.25 | 39.24 | 39.25 | 39.24 | 39.25 | 39.21 |
| Durability of water Dw | 1 | 1 | 1 | 1 | 1 | 1 | 1 |
| Durability of acid $D_A$ | 1 | 1 | 1 | 1 | 1 | 1 | 1 |
| Bubble content | $A_{00}$ | $A_{00}$ | $A_{00}$ | $A_{00}$ | $A_{00}$ | $A_0$ | $A_0$ |

TABLE 5

| Component % | Embodiment 29 | Embodiment 30 | Embodiment 31 | Embodiment 32 | Embodiment 33 | Embodiment 34 | Embodiment 35 |
|---|---|---|---|---|---|---|---|
| $B_2O_3$ | 12.5 | 16.9 | 23 | 13 | 7 | 5 | 8 |
| $SiO_2$ | 3.8 | 4 | 3 | 0.5 | 9 | 11.5 | 5 |
| $ZrO_2$ | 6 | 3 | 4.7 | 6.4 | 1.5 | 14 | 2.4 |
| $TiO_2$ | 2.8 | 2.4 | 0.6 | 0.8 | 1 | 1.3 | 1.6 |
| $La_2O_3$ | 32 | 25 | 35 | 41.3 | 37.5 | 31 | 40 |
| $Gd_2O_3$ | 24 | 15.9 | 27 | 30.5 | 28 | 20 | 26 |
| $Y_2O_3$ | 0 | 10 | 5.6 | 1 | 9 | 9.7 | 8 |
| $Yb_2O_3$ | 0 | 1 | 0 | 0 | 0 | 0 | 0 |
| $Ta_2O_5$ | 6.9 | 2 | 1.1 | 6.5 | 7 | 7.5 | 9 |
| ZnO | 0 | 15 | 0 | 0 | 0 | 0 | 0 |
| BaO | 0.4 | 1.8 | 0 | 0 | 0 | 0 | 0 |
| CaO | 1.9 | 1 | 0 | 0 | 0 | 0 | 0 |
| SrO | 0 | 2 | 0 | 0 | 0 | 0 | 0 |
| MgO | 0 | 0 | 0 | 0 | 0 | 0 | 0 |
| $WO_3$ | 0 | 0 | 0 | 0 | 0 | 0 | 0 |

TABLE 5-continued

| Component % | Embodiment 29 | Embodiment 30 | Embodiment 31 | Embodiment 32 | Embodiment 33 | Embodiment 34 | Embodiment 35 |
|---|---|---|---|---|---|---|---|
| $Sb_2O_3$ | 0.1 | 0 | 0 | 0 | 0 | 0 | 0 |
| $Li_2O$ | 3.5 | 0 | 0 | 0 | 0 | 0 | 0 |
| $Na_2O$ | 1.1 | 0 | 0 | 0 | 0 | 0 | 0 |
| $K_2O$ | 5 | 0 | 0 | 0 | 0 | 0 | 0 |
| $La_2O_3/Gd_2O_3$ | 1.333333 | 1.572327 | 1.296296 | 1.354098 | 1.339286 | 1.55 | 1.538462 |
| $La_2O_3 + Gd_2O_3 + Y_2O_3 + Yb_2O_3$ | 56 | 51.9 | 67.6 | 72.8 | 74.5 | 60.7 | 74 |
| $Li_2O + Na_2O + K_2O$ | 9.6 | 0 | 0 | 0 | 0 | 0 | 0 |
| Total content | 100 | 100 | 100 | 100 | 100 | 100 | 100 |
| Upper crystallization temperature ° C. | 1300 | 1330 | 1330 | 1300 | 1320 | 1300 | 1300 |
| Refractive index nd | 1.883 | 1.886 | 1.879 | 1.883 | 1.884 | 1.89 | 1.891 |
| Abbe number vd | 39.14 | 39.19 | 39.25 | 39.3 | 39.18 | 39.24 | 39.21 |
| Durability of water Dw | 2 | 2 | 2 | 2 | 2 | 2 | 2 |
| Durability of acid $D_A$ | 2 | 2 | 2 | 2 | 2 | 2 | 2 |
| Bubble content | $A_0$ | $A_0$ | A | $A_0$ | $A_0$ | $A_0$ | $A_0$ |

TABLE 6

| Component % | Embodiment 36 | Embodiment 37 | Embodiment 38 | Embodiment 39 | Embodiment 40 | Embodiment 41 | Embodiment 42 |
|---|---|---|---|---|---|---|---|
| $B_2O_3$ | 16.8 | 7.8 | 8.5 | 21.2 | 8.5 | 22.2 | 16.5 |
| $SiO_2$ | 5 | 2 | 1 | 8.5 | 1.8 | 5.9 | 5.8 |
| $ZrO_2$ | 6.5 | 8.7 | 7.2 | 1.5 | 0.5 | 5.8 | 6.1 |
| $TiO_2$ | 2 | 3.5 | 5 | 6.4 | 8 | 1.5 | 1.9 |
| $La_2O_3$ | 30 | 32.4 | 43 | 34.3 | 41 | 34 | 38.5 |
| $Gd_2O_3$ | 22 | 20 | 30 | 24 | 26 | 26 | 24 |
| $Y_2O_3$ | 4.2 | 3.6 | 2 | 0.1 | 6 | 1 | 0 |
| $Yb_2O_3$ | 8 | 0 | 0 | 0 | 0 | 0.5 | 0 |
| $Ta_2O_5$ | 5.5 | 6 | 3.3 | 4 | 8.2 | 0.5 | 3.6 |
| ZnO | 0 | 2 | 0 | 0 | 0 | 0 | |
| BaO | 0 | 1 | 0 | 0 | 0 | 0 | 1.3 |
| CaO | 0 | 5 | 0 | 0 | 0 | 0 | 0 |
| SrO | 0 | 8 | 0 | 0 | 0 | 0 | 0 |
| MgO | 0 | 0 | 0 | 0 | 0 | 2.6 | 2.3 |
| $WO_3$ | 0 | 0 | 0 | 0 | 0 | 0 | 0 |
| $Sb_2O_3$ | 0 | 0 | 0 | 0 | 0 | 0 | 0 |
| $Li_2O$ | 0 | 0 | 0 | 0 | 0 | 0 | 0 |
| $Na_2O$ | 0 | 0 | 0 | 0 | 0 | 0 | 0 |
| $K_2O$ | 0 | 0 | 0 | 0 | 0 | 0 | 0 |
| $La_2O_3/Gd_2O_3$ | 1.363636 | 1.62 | 1.433333 | 1.429167 | 1.576923 | 1.307692 | 1.604167 |
| $La_2O_3 + Gd_2O_3 + Y_2O_3 + Yb_2O_3$ | 64.2 | 56 | 75 | 58.4 | 73 | 61.5 | 62.5 |
| $Li_2O + Na_2O + K_2O$ | 0 | 0 | 0 | 0 | 0 | 0 | 0 |
| Total content | 100 | 100 | 100 | 100 | 100 | 100 | 100 |
| Upper crystallization temperature ° C. | 1290 | 1340 | 1285 | 1280 | 1310 | 1290 | 1300 |
| Refractive index nd | 1.885 | 1.883 | 1.884 | 1.885 | 1.891 | 1.879 | 1.882 |
| Abbe number vd | 39.25 | 39.12 | 39.25 | 39.2 | 38.77 | 39.19 | 39.26 |
| Durability of water Dw | 1 | 3 | 2 | 1 | 2 | 1 | 1 |
| Durability of acid $D_A$ | 1 | 3 | 2 | 1 | 2 | 1 | 1 |
| Bubble content | $A_0$ | A | $A_0$ | $A_{00}$ | $A_0$ | $A_0$ | $A_0$ |

Embodiment of Optical Preform

The optical glass obtained in Embodiment 1 in Table 1 is cut into a predetermined size, and a surface is uniformly coated with a mold release agent composed of boron nitride powder, and then it is heated, softened, and press-molded to make preforms of various lenses and prisms such as a concave meniscus lens, a convex meniscus lens, a biconvex lens, a biconcave lens, a planoconvex lens, and a planoconcave lens.

Embodiment of Optical Element

These preforms obtained in the above embodiment of the optical preform are annealed, fine-adjustment is performed while internal deformation of the glass is reduced, so that the optical characteristics such as the refractive index reach desired values.

Subsequently, each preform is ground and polished to manufacture the various lenses and prisms such as the concave meniscus lens, the convex meniscus lens, the biconvex lens, the biconcave lens, the planoconvex lens, and the planoconcave lens. A surface of the obtained optical element may also be coated with an anti-reflection film.

The above are only preferred embodiments of the disclosure, and are not intended to limit the disclosure. Various modifications and changes may be made to the disclosure by those skilled in the art. Any modifications, equivalent replacements, improvements and the like made within spirit and principle of the disclosure should be included in a scope of protection of the disclosure.

What is claimed is:

1. An optical glass, in terms of oxide mass percentages, the optical glass comprises: $B_2O_3$: 5-25%, $SiO_2$: 0.5-15%, $ZrO_2$: 1-15%, $TiO_2$: 0.5-10%, and the sum of $La_2O_3$, $Gd_2O_3$, $Y_2O_3$ and $Yb_2O_3$ is 63.6-75%, and $Nb_2O_5$ is not comprised, a weight ratio of $La_2O_3$ to $Gd_2O_3$, i.e., $La_2O_3/Gd_2O_3$, is 1.28-1.625.

2. The optical glass according to claim 1, wherein the optical glass further comprises one or more selected from a group consisting of ZnO, BaO, CaO, SrO, MgO, $WO_3$, $Sb_2O_3$, $Li_2O$, $Na_2O$ and $K_2O$, and the content is as follows: ZnO: 0-15%, BaO: 0-10%, CaO: 0-10%, SrO: 0-10%, MgO: 0-10%, $WO_3$: 0-10%, $Sb_2O_3$: 0-1%, and the sum of $Li_2O$, $Na_2O$ and $K_2O$ is 0-10%.

3. The optical glass according to claim 2, in terms of oxide mass percentages, the optical glass comprises: $B_2O_3$: 8-22%, $SiO_2$: 3-10%, $ZrO_2$: 3-12%, $TiO_2$: 0.5-7%, and/or the sum of $La_2O_3$, $Gd_2O_3$, $Y_2O_3$ and $Yb_2O_3$ is 64.2-70%.

4. The optical glass according to claim 2, wherein the $WO_3$ content of the optical glass is 0.1-5%.

5. The optical glass according to claim 1, in terms of oxide mass percentages, the optical glass consists of $B_2O_3$: 5-25%, $SiO_2$: 0.5~15%, $ZrO_2$: 1-15%, $TiO_2$: 0.5-10%, ZnO: 0-15%, BaO: 0-10%, CaO: 0-10%, SrO: 0-10%, MgO: 0-10%, $WO_3$: 0-10%, $Ta_2O_5$: 0.5-10%, the sum of $Li_2O$, $Na_2O$ and $K_2O$ is 0-10%, $Sb_2O_3$: 0-1%, and the sum of $La_2O_3$, $Gd_2O_3$, $Y_2O_3$ and $Yb_2O_3$ is 63.6-75%, wherein, the weight ratio of $La_2O_3$ to $Gd_2O_3$, i.e., $La_2O_3/Gd_2O_3$, is 1.28-1.625.

6. The optical glass according to claim 5, in terms of oxide mass percentages, wherein at least one of the following applies: $B_2O_3$: 8-22%, $SiO_2$: 3-10%, $ZrO_2$: 3-12%, $TiO_2$: 0.5-7%, and the sum of $La_2O_3$, $Gd_2O_3$, $Y_2O_3$ and $Yb_2O_3$ is 64.2-70%.

7. The optical glass according to claim 5, wherein the $La_2O_3/Gd_2O_3$ is 1.3-1.6.

8. The optical glass according to claim 1, in terms of oxide mass percentages, the optical glass comprises: $B_2O_3$: 8-22%, $SiO_2$: 3-10%, $ZrO_2$: 3-12%, $TiO_2$: 0.5-7%, and/or the sum of $La_2O_3$, $Gd_2O_3$, $Y_2O_3$ and $Yb_2O_3$ is 64.2-70%.

9. The optical glass according to claim 1, wherein the $Y_2O_3$ content of the optical glass is 0-10%.

10. The optical glass according to claim 9, wherein the $Y_2O_3$ content of the optical glass is 0.1-8%.

11. The optical glass according to claim 1, wherein the $WO_3$ content of the optical glass is 0.1-5%.

12. The optical glass according to claim 1, wherein the $La_2O_3/Gd_2O_3$ is 1.3-1.6.

13. The optical glass according to claim 12, wherein the $La_2O_3/Gd_2O_3$ is 1.4-1.5.

14. The optical glass according to claim 1, wherein a upper crystallization temperature of the optical glass is lower than 1350° C.

15. The optical glass according to claim 14, wherein a upper crystallization temperature of the optical glass is lower than 1300° C.

16. The optical glass according to claim 1, wherein a refractive index of the optical glass nd>1.87; and an Abbe number vd>38.0; durability of water Dw of the optical glass is above grade 3; and durability of acid $D_A$ is above grade 3; a extent of striae of the optical glass is above grade B; and a bubble content is above grade A.

17. The optical glass according to claim 16, wherein durability of water Dw of the optical glass is above grade 2; and durability of acid $D_A$ is above grade 2; the refractive index of the optical glass nd>1.88; and the Abbe number vd>39.0; the extent of striae of the optical glass is above grade B; and the bubble content is above grade $A_0$.

18. The optical glass according to claim 17, wherein the extent of striae of the optical glass is above grade A; and the bubble content is above grade $A_{00}$; durability of water Dw of the optical glass is above grade 1; and durability of acid $D_A$ is above grade 1.

19. A glass preform or an optical element, wherein it is made of the optical glass according to claim 1.

20. An optical instrument, comprising an optical element, wherein the optical element is the optical element according to claim 19.

* * * * *